United States Patent [19]

Roettger

[11] Patent Number: 5,131,225
[45] Date of Patent: Jul. 21, 1992

[54] APPARATUS FOR SEPARATING AND COMPRESSING OXYGEN FROM AN AIR STREAM

[75] Inventor: Belinda F. Roettger, Rockford, Ill.

[73] Assignee: Sundstrand Corporation, Rockford, Ill.

[21] Appl. No.: 576,057

[22] Filed: Aug. 31, 1990

[51] Int. Cl.$^5$ ............................ F02C 6/18; F02C 7/26; F02C 1/00
[52] U.S. Cl. .............................. 60/39.07; 60/39.142; 60/727
[58] Field of Search ................... 60/39.142, 39.07, 727; 55/267

[56] References Cited

U.S. PATENT DOCUMENTS

| | | | |
|---|---|---|---|
| 4,508,548 | 4/1985 | Manatt | 55/158 |
| 4,777,793 | 10/1988 | Weigand et al. | 60/39.142 |
| 4,827,716 | 5/1989 | Vershure, Jr. | 60/39.07 |
| 4,877,506 | 10/1989 | Fee et al. | 204/242 |
| 4,879,016 | 11/1989 | Joshi | 204/242 |

OTHER PUBLICATIONS

D. R. Griffiths, "Navy to Test On-Board Oxygen Generator", Feb. 3, 1980, pp. 56–57.

Primary Examiner—Richard A. Bertsch
Assistant Examiner—Howard R. Richman
Attorney, Agent, or Firm—Marshall, O'Toole, Gerstein, Murray & Bicknell

[57] ABSTRACT

A system and method of separating the gaseous components of air to provide a compressed oxygen-enriched gas stream and a nitrogen-enriched gas stream are disclosed. The separation system and method generate an oxygen-enriched stream including substantially pure oxygen, such as about 99% or greater oxygen, and having a pressure of up to about 10,000 pounds per square inch, thereby eliminating the need for a separate compressor to compress the oxygen-enriched gas stream. The oxygen separation system and method are used in aircraft to supply substantially pure oxygen that facilitates in-flight operation of an aircraft emergency power unit, especially at high altitudes. The system includes an oxygen separator, such as a ceramic-type oxygen separator, that is operative during in-flight procedures to derive compressed, substantially pure oxygen from feed air provided to the oxygen separator without the use of a compressor; means for storing the substantially pure oxygen in compressed form; and means coupled between the storing means and an emergency power unit for delivering the compressed oxygen to the power unit whereby such oxygen acts as an oxidizer for fuel fed to the power unit.

11 Claims, 1 Drawing Sheet

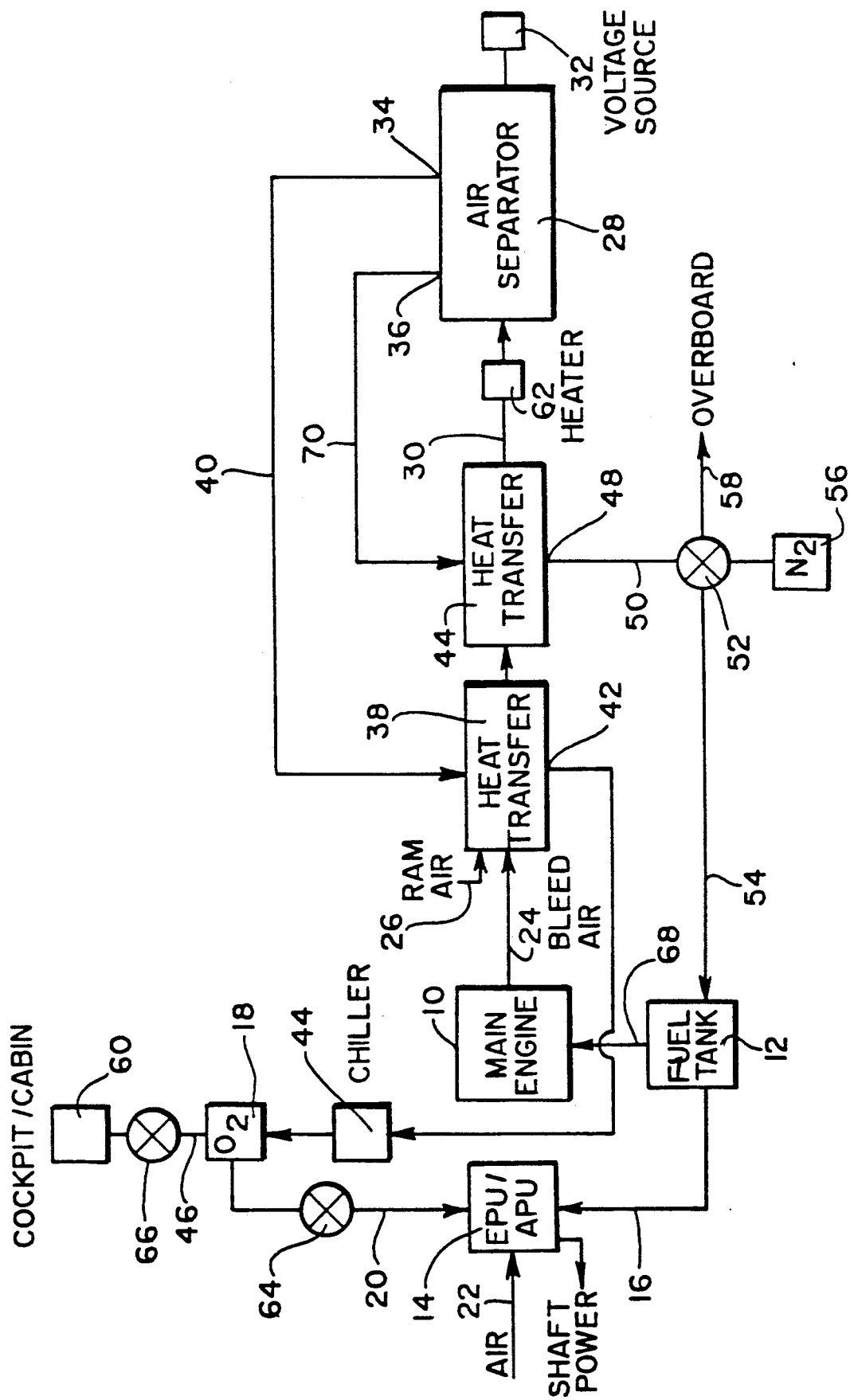

APPARATUS FOR SEPARATING AND COMPRESSING OXYGEN FROM AN AIR STREAM

TECHNICAL FIELD

The present invention generally relates to the generation of compressed oxygen from a stream of atmospheric air, and more particularly relates to separating substantially pure and compressed oxygen from an air stream on an aircraft. The substantially pure and compressed oxygen can be used in an emergency situation to rapidly and reliably start an aircraft emergency power unit or auxiliary power unit in-flight.

BACKGROUND OF THE INVENTION

Generally, an aircraft has one or more primary engines that provide thrust for the aircraft and pressurized bleed air for the environmental control systems. The primary engine also provides power to drive electric generators and hydraulic pumps that are necessary for powering instruments and flight control systems. In turbine-powered aircraft, aircraft control surfaces generally are linked by electrical or hydraulic circuits. Consequently, in the event of an electrical or hydraulic failure, the pilot cannot alter the aerodynamic configuration of the aircraft until power is restored. As a result, turbine-powered aircraft require an emergency power unit that is capable of responding to a power failure and providing a sizable quantity of electrical or hydraulic energy rapidly such that the pilot can regain control of the aircraft.

Turbine-powered aircraft, like other complex aircraft, also require an auxiliary power unit to provide electrical and hydraulic energy, and bleed air, when the primary engine or engines of the aircraft are not in use, for example when the aircraft is on the ground. The auxiliary power unit also can provide power to start the primary engines, either on the ground or in flight. Both the primary engine and the auxiliary power unit operate on aviation fuel drawn from the main fuel tanks of the aircraft. Combustion is supported by mixing the aviation fuel with air drawn from the atmosphere. In many instances, starting the auxiliary power unit requires an external power source such as a battery, a pressurized air tank or a hydraulic accumulator. Typically, both the emergency power unit and the auxiliary power unit can be employed to drive a generator and/or a hydraulic pump.

In some aircraft, an auxiliary power unit easily can be adapted to serve as an emergency power unit as well, thereby minimizing space and weight requirements. However, the adaptation is difficult on high performance aircraft that operate at high altitudes. In particular, a typical auxiliary power unit is an air-breathing engine designed primarily to operate on the ground where the air is relatively dense. Therefore, the auxiliary power unit may be incapable of operating at high altitudes, for example above 55,000 feet, where the density of the air is insufficient to start the turbine and rapidly bring the turbine up to an operating speed that produces emergency power in an emergency situation. It is therefore evident that in many situations the auxiliary power unit could not restart a failed primary engine at a high altitude, and accordingly no electrical or hydraulic power would be available for control of the aircraft.

It is necessary therefore to equip an aircraft with an auxiliary or an emergency power unit that is capable of operating independent of external conditions, like air density; that can provide in-flight emergency electrical and hydraulic power to the flight control systems; and that can be used to restart the primary engines in-flight. Since the emergency power unit is operated only in the event of an emergency, the unit remains stored and inactive for long periods of time, but is required to start quickly and to provide continuous power output for a prespecified duty cycle. Ideally, such an emergency power unit is compact, lightweight, reliable, easily maintained, and requires no special handling of materials or fuels, while providing a combustion process that is controllable and that produces a clean, nontoxic combustion gas.

To overcome some of the above-discussed problems, Friedrich, in U.S. Pat. No. 4,092,824, disclosed a turbine used for starting aircraft engines and for driving auxiliary equipment, such as a generator. The turbine is capable of operating in a conventional air-breathing mode as well as in an emergency mode that does not require air. In particular, Friedrich includes a supply of hydrazine on the aircraft. Hydrazine is capable of undergoing an exothermic decomposition reaction, and the heat of decomposition is utilized to vaporize aircraft fuel and thereby provide a volume of hot gas that drives the turbine in an emergency situation.

The method disclosed by Friedrich solves a number of the previously-specified problems, but the method also has definite disadvantages. Liquid hydrazine is corrosive and toxic, thereby requiring special handling procedures and design considerations. In addition, the soot-like decomposition products of hydrazine method can accumulate within the turbine and decrease turbine efficiency. More significantly, because the method is based on an exothermic decomposition reaction, it necessarily follows that a fuel utilized in the method, like hydrazine, must be sufficiently unstable to undergo a rapid decomposition. The presence of such an unstable fuel on an aircraft presents unacceptable hazards. Still another disadvantage is that hydrazine and proper hydrazine storage facilities may not be available at all ground support locations for the aircraft. Thus, recharging an aircraft with hydrazine fuel becomes a problem, particularly because hydrazine is toxic and is difficult to handle.

To avoid the problems and disadvantages inherent in a hydrazine-based system, oxygen preferably is utilized as the oxidant for fuel in an aircraft emergency situation. The oxygen supply can be in the form of compressed air stored in tanks on the aircraft. However, compressed air has the disadvantages of requiring extensive, and expensive, landbased recharging stations and of including a relatively low concentration, i.e. 21%, of oxygen.

Therefore, it has been proposed that oxygen-enriched air or pure oxygen be used as the oxidant for fuel in an aircraft emergency situation. Oxygen or oxygen-enriched air can start a turbine more easily when combusted with fuel and can bring the turbine up to speed more reliably than compressed air. Therefore, if oxygen or oxygen-enriched air is utilized as the fuel oxidant, the difficulty in reliably bringing a turbine up to speed to provide power at high altitude is overcome. Additionally, neither oxygen nor oxygen-enriched air is unstable in the same sense as hydrazine. However, even though oxygen and oxygen-enriched air overcome many of the problems presented by hydrazine and compressed air, it would be desirable to eliminate the need for extensive landbased recharging or regenerating stations and to reduce the space and weight requirements of extensive on-board storage of oxygen or oxygen-enriched air.

Ambient air contains a sufficient amount of oxygen to oxidize a fuel in an emergency situation. But the oxygen must be isolated from the ambient air in a substantially pure form and stored for later use. Investigators therefore sought methods of isolating oxygen from the ambient air to meet the oxygen quality and quantity requirements with a compact and lightweight apparatus. Consequently, numerous methods and systems were devised to separate a stream of air having an ambient concentration of oxygen and nitrogen into a usable supply of gas possessing an enhanced oxygen concentration and into a usable supply of gas possessing an enhanced nitrogen concentration.

For example, Manatt in U.S. Pat. No. 4,508,548 disclosed an air separation module based upon the differing permeabilities of oxygen gas and nitrogen gas through a hollow, permeable film. The method utilizes a pressure gradient to separate the oxygen from the nitrogen in air. However, the method provides only moderately oxygen-enriched air, i.e. 35-45% oxygen, whereas ambient air includes about 21% oxygen; and provides nitrogen-enriched air still containing about 9% oxygen. Manatt teaches that such oxygen-enriched air can be used in aircraft for breathing purposes, but no suggestion was made that such moderately oxygen-enriched air is suitable as a fuel oxidant in an aircraft auxiliary or emergency power unit. In contrast, the oxygen separation system and method of the present invention provide a substantially pure stream of compressed oxygen gas including about 99% or greater oxygen.

Wiegand et al. in U.S. Pat. No. 4,777,793 disclosed an aircraft emergency power unit that utilizes compressed air as the fuel oxidant. The compressed air can be stored in tanks or can be the bleed air from the main aircraft engines. Wiegand et al. do not teach or suggest separating the compressed air to provide an oxygen-enriched gas stream.

Vershure in U.S. Pat. No. 4,827,716 disclosed that oxygen-enriched air is preferred over compressed air in an aircraft emergency situation, such as in restarting a primary engine at a high altitude. Vershure teaches the separation of bleed air into an oxygen-enriched air stream and a nitrogen-enriched air stream, followed by compression and storage of the gas streams for future use on the aircraft. However, Vershure does not teach or suggest a particular method or apparatus for separating the bleed air into enriched gas streams.

Fee et al. in U.S. Pat. No. 4,877,506 disclosed a ceramic oxygen separator having a particular corrugated configuration. Fee et al. do not teach or suggest the use of a ceramic separator on an aircraft to provide compressed oxygen-enriched and nitrogen-enriched gas streams.

Another type of oxygen generator is discussed in *Aviation Week and Space Technology*, pp. 56-57, (Feb. 3, 1980). This publication described an adsorption-desorption interaction between oxygen and a molecular sieve to provide breathing oxygen for an aircraft crew. The method utilizes a molecular sieve, such as a zeolite, to preferentially adsorb the oxygen in the bleed air over the nitrogen, and therefore store the oxygen for later use.

Therefore, in summary, emergency power units have been developed for quick high altitude starts of a primary aircraft engine or for other uses. Often, compressed air is used as the fuel oxidizer in starting the emergency power unit. However, the reliability of the start is increased significantly if compressed oxygen-enriched air is used as the oxidizer rather than compressed ambient air. Furthermore, as the percentage of oxygen in the compressed gaseous stream increases, the reliability of the start increases. Additionally, equipment currently used for storing compressed air or oxygen-enriched air is heavy and requires regular replenishment from landbased facilities.

The prior methods and systems utilized to provide a sufficient amount of oxygen on an aircraft to quickly and reliably start and maintain combustion in an emergency power unit included tanks of compressed air or of oxygen. This method has the disadvantages of requiring storage tanks that are heavy and bulky, and depending upon landbased recharging stations.

Generating oxygen or oxygen-enriched air on board on aircraft, and in-flight, eliminates the need for recharging facilities at each airbase. But, until the system and method of the present invention, the aircraft also required an on-board compressor to compress the oxygen or oxygen-enriched gas stream. Therefore, in accordance with an important feature of the present invention, a substantially pure stream of oxygen gas, including about 99% or greater oxygen, is generated in-flight from an atmospheric air source, such as bleed air, ram air or unpressurized ambient air. The method selectively separates the oxygen from the air source, and the generated stream of substantially pure oxygen can demonstrate a pressure up to about 10,000 psi, thereby eliminating the need for an on-board compressor to compress the substantially pure stream of oxygen.

SUMMARY OF THE INVENTION

In accordance with the present invention, a method of generating a stream of compressed, substantially pure oxygen, without the use of a compressor, provides an in-flight oxygen source that can be used either in emergency situations, such as quickly starting an emergency power unit that restarts a primary engine.

More particularly, a system for providing combustion oxygen to an aircraft emergency power unit during in-flight starting procedures includes an oxygen separator operative while the aircraft is in flight and having an input that receives feed air and an output at which compressed oxygen is developed; a storage tank; first means for interconnecting the output of the oxygen separator and the storage tank whereby compressed oxygen is stored therein; and second means for interconnecting the storage tank and the emergency power unit and operative in response to an engine start command to transfer compressed oxygen to a fuel combustion chamber of the emergency power unit.

Preferably, the oxygen separator is a ceramic-type oxygen separator that operates at an elevated process temperature; and the system further includes means coupled to the separator output for cooling the compressed oxygen prior to storing the oxygen in the storage tank. To achieve the full advantage of the present invention, the means for cooling the compressed oxygen prior to storage is a heat exchanger that places the compressed oxygen in heat transfer relationship with the feed air. The oxygen separator also can include a second output at which nitrogen-enriched air is developed, and the system can include a further heat exchanger coupled to the second output that places the nitrogen-enriched air in heat-transfer relationship with the feed air.

In accordance with an important aspect of the present invention, the oxygen separation system and method are utilized to separate, and simultaneously compress, oxygen present in air, and thereby provide a compressed oxygen-enriched gas stream and a nitrogen-enriched gas stream. The oxygen separation system and method produce an oxygen-enriched stream including substantially pure oxygen, such as about 99% or greater oxygen, and having a pressure up to about 10,000 psi (pounds per square inch). Therefore, an on-board compressor to compress the oxygen-enriched gas stream for storage is obviated. The high-purity oxygen stream and the absence of a compressor makes the oxygen separation system and method of the present invention ideal for use in aircraft as a means to supply substantially pure oxygen to facilitate in-flight operation of an aircraft emergency power unit or an aircraft auxiliary power unit, especially at high altitudes. The compressed stream of oxygen-enriched air is sufficiently pure to provide a fast and reliable start-up and to maintain efficient combustion; and the apparatus, absent a compressor, is sufficiently compact and lightweight for use in aircraft.

In accordance with a further aspect of the present invention, the oxygen generation system and method utilize engine bleed air, ram air or air from another suitable source, including unpressurized ambient air, as the feed stream. The feed stream is heated to a temperature of at least about 500° C. and is fed into a ceramic oxygen generator that also serves as the compressor. An electrical potential of up to about 2 volts applied across the ceramic oxygen generator separates the oxygen gas in the feed stream from the nitrogen gas, and the oxygen gas is pumped through an oxygen-conducting ceramic, like for example zirconia, hafnia, ceria or bismuth oxide. A ceramic oxygen generator, including the oxygen-conducting ceramic, is described in Joshi, U.S. Pat. No. 4,879,016, hereby incorporated by reference. The method is selective in that essentially only the oxygen in the feed stream is separated from the feed stream. Accordingly, an oxygen-enriched gas stream, having a pressure up to about 10,000 psi, and a nitrogen enriched gas stream are generated by the ceramic oxygen separator. Such a high pressure oxygen gas stream is generated because a voltage gradient rather than a pressure gradient is used to drive the process of separating oxygen from the heated feed stream of air.

In accordance with a preferred embodiment of the present invention, both the compressed oxygen-enriched stream and the nitrogen-enriched stream are collected and stored on the aircraft for future use. For example, the substantially pure oxygen is used to oxidize fuel in the start up and running of an emergency or auxiliary power unit. The nitrogen-enriched stream can be fed to the main fuel tanks to serve as an inert blanket over the fuel.

Further in accordance with the preferred embodiment, the substantially pure oxygen stream and the nitrogen-enriched stream exiting from the oxygen separator have a temperature of at least about 500° C. Therefore, both hot gas streams are passed through heat transfer units such that the enriched gas streams are cooled, and the heat extracted from the enriched gas streams is used to heat the feed stream entering the oxygen separator.

In accordance with a further aspect of the present invention, an improvement in an aircraft starting system having a power unit that burns fuel and produces motive power for starting an aircraft engine in flight includes an oxygen separator, such as a ceramic-type oxygen separator, that is operative during in-flight procedures to derive compressed, substantially pure oxygen from feed air provided to the oxygen separator without the use of a compressor; means for storing the substantially pure oxygen in compressed form; and means coupled between the storing means and the power unit for delivering the compressed oxygen to the power unit whereby such oxygen acts as an oxidizer for the fuel.

In accordance with a still further aspect of the present invention, a method of operating an aircraft emergency power unit while the aircraft is in flight includes providing an oxygen separator, like a ceramic-type oxygen separator, on-board the aircraft; supplying feed air to the oxygen separator while the aircraft is in flight; operating the oxygen separator as feed air is supplied to the separator so that the separator produces substantially pure oxygen in compressed form; storing the substantially pure oxygen in the compressed form on-board the aircraft; introducing the compressed oxygen and a fuel to a combustion chamber of the emergency power unit when the emergency power unit is to be started; and igniting the fuel in the combustion chamber.

In accordance with this aspect of the present invention, the feed air is heated before the feed air is supplied to the oxygen separator and the substantially pure, compressed oxygen is cooled before the oxygen is stored. To achieve the full advantage of the present invention, a heat exchanger cools the substantially pure oxygen, and the extracted heat is utilized to heat the feed air. Further, in this aspect of the invention, a nitrogen-enriched air stream also is produced by the oxygen separator and is cooled by a second heat exchanger, whereby the extracted heat also is used to heat the feed air. The cooled nitrogen-enriched air is stored in an aircraft fuel tank.

The present invention does not rely upon a pressure gradient or a preferential adsorption-desorption to separate the oxygen from an ambient air stream. The present invention utilizes a voltage gradient to provide substantially pure oxygen having a pressure up to about 10,000 psi. Therefore, an on-board compressor is not required to compress the substantially pure oxygen stream. Accordingly, the oxygen separation system and method of the present invention are ideally-suited for use on aircraft to provide substantially pure and compressed oxygen as the fuel oxidizer to quickly and reliably start and maintain combustion in an emergency or an auxiliary power unit.

As will be discussed more fully hereinafter, the oxygen separation system and method demonstrate the advantages of providing high purity oxygen for faster and more reliable oxidation of a fuel; of providing highly compressed oxygen thereby precluding the need for an on-board compressor; of generating substantially pure and compressed oxygen on-board and in-flight, thereby eliminating extensive on-board compressed air storage and landbased recharging stations; of utilizing bleed air, ram air or unpressurized ambient air as a source for the feed gas; and of utilizing a highly selective and a relatively lightweight oxygen separator that is substantially free of maintenance.

BRIEF DESCRIPTION OF THE DRAWINGS

The FIGURE is a block diagram of an oxygen separation system for installation on an aircraft to generate a substantially pure, compressed oxygen stream and a nitrogen-enriched gas stream.

DESCRIPTION OF THE PREFERRED EMBODIMENT

Referring now to the FIGURE, a preferred embodiment of the oxygen separation system and method of the present invention is depicted in an on-board installation on a turbine-powered aircraft. More particularly, the turbine powered aircraft has at least one turbine-powered main engine 10 and at least one fuel tank 12 for providing fuel to the main engine 10 by line 68. Fuel tank 12 also provides fuel to a power unit 14. Power unit 14 can be an emergency power unit, an auxiliary power unit or a combination emergency-auxiliary power unit, and also is powered by a turbine.

Under normal flying conditions, power unit 14 is not in use. However, in an emergency situation, power unit 14 is started, and combustion is maintained, in order to restart the main engine 10 and allow the main engine 10 to rapidly attain a turbine speed sufficient to provide power to the aircraft. The fuel required to start the power unit 14 is supplied from the fuel tank 12 by a fuel line 16 and the oxygen needed to oxidize the fuel is supplied from an oxygen storage tank 18 by intake 20. As previously stated, power unit 14 is more quickly started and combustion is more reliably maintained by pure oxygen or by an oxygen-enriched air stream. especially at a high altitude. Therefore, if substantially pure oxygen or oxygen-enriched air is supplied to power unit 14, the power unit 14 and the main engine 10 are brought to full turbine speed more quickly. Accordingly, the pilot regains control of the aircraft more quickly.

On the ground and under normal flying conditions, the power unit 14 receives air from an intake 22. The air serves as the oxidant for fuel from the fuel tank 12 under normal circumstances. However, in emergency in-flight situations, the turbine of the power unit 14 must be brought up to speed rapidly and reliably. Therefore, the power unit 14 is adapted to receive an enriched oxidant, such as substantially pure oxygen or oxygen-enriched air, that will reliably support rapid combustion. The enriched oxidant is received on the intake 20. The present invention provides substantially pure and compressed oxygen to be used as the enriched oxidant to start and maintain combustion in the power unit 14.

The enriched oxidant used to start and maintain the power unit 14 is derived from air. As is well known, the turbine exhaust of the main engine 10 produces a thrust. Engine bleed air, along line 24, can be used as the feed air that ultimately provides the enriched oxidant. Alternatively, ambient ram air or unpressurized ambient air from line 26 can be used as the feed air that ultimately provides the enriched oxidant.

In general, the feed air that ultimately provides the enriched oxidant can be supplied from any convenient source. However, bleed air from line 24 or ram air from line 26 are preferred sources for the feed air. To achieve the full advantage of the present invention, the feed air is bleed air supplied by main engine 10 through line 24. The bleed air generally has a temperature in the range of from about 50° C. to about 450° C. as it exits the main engine 10. As will be discussed more fully hereinafter, the feed air then is heated to a temperature of at least about 500° C., such as by heat transfer units 38 and 44 and heater 62, before the feed air is separated into a substantially pure oxygen gas stream and a nitrogen-enriched gas stream by an air separator 28. In addition, the air separator 28 also is operated at an elevated temperature, such as from about 400° C. to about 1000° C. Therefore, the air separator 28 also serves to heat the air stream after the air separator 28 has been engaged and attained its operating temperature.

The heated feed air is introduced into the air separator 28 by line 30. The feed gas passing through line 30 has a temperature in the range of from about 400° C. to about 1000° C., and preferably in the range of from about 600° C. to about 900° C. If the feed gas in line 30 is insufficiently heated, a heater 62 can be engaged to increase the temperature of the feed gas to the desired level. When the air separator 28 attains its operating temperature, heater 62 can be disengaged. The feed air enters air separator 28 from line 30 at a pressure of from about one psi, when unpressurized ambient air at a high altitude is used as the feed air, to about 300 psi.

A voltage gradient is applied across the air separator 28 by a voltage source 32 such that the oxygen in the feed air is reduced to oxide ions at a cathode in the air separator 28 by a four electron transfer. The oxide ions are driven by the applied voltage to an anode of the air separator 28 through an oxygen-conducting ceramic, like a zirconia, hafnia, ceria or bismuth oxide, separating the cathode and the anode of the air separator 28. The nitrogen and argon in the feed gas are not affected by the voltage source. Likewise, various contaminants that may be present in the feed gas also will not be affected by the voltage source. Furthermore, even if a particular contaminant in the feed air can be reduced at the cathode, the reduced-form of the contaminant, and nitrogen and argon, are incapable of migrating through the selective oxygen-conducting ceramic layer.

At the anode of the air separator 28, the oxide ions are oxidized back to oxygen by a four electron transfer. Therefore, because the inert gas content of the feed air, i.e. nitrogen and argon, and a variety of contaminants are not reduced at the cathode, they do not migrate through the oxygen-specific ceramic; and because the ceramic layer is highly selective to oxide ion transport, contaminants in the feed air, even if reduced at the cathode, do not contaminate the generated oxygen. Accordingly, the feed air is separated into a substantially pure stream of oxygen, including about 99% or greater oxygen, and a nitrogen-enriched stream by the air separator 28.

The substantially pure oxygen stream exiting the air separator 28 via output 34 can have a pressure of up to about 10,000 psi. It has been found that a ceramic type air separator having a tubular configuration is more amenable for compression of the oxygen stream to provide an oxygen stream. This oxygen pressure exiting the air separation can be sufficient such that a separate on-board compressor is not necessary to compress the oxygen gas stream exiting the output 34. A ceramic-type of oxygen separator is preferred because a ceramic oxygen separator is compact, lightweight, operates at a low voltage, and is capable of simultaneously producing high-purity oxygen and compressing the oxygen without the extensive equipment or dangers associated with other oxygen separators or generators.

The substantially pure stream of oxygen exiting air separator 28 via output 34 has a temperature of at least 500° C. and a pressure of up to about 10,000 psi. The oxygen stream then is directed to a first heat transfer unit 38 by line 40. Within the first heat transfer unit 38, the oxygen stream and the feed air are placed in a heat transfer relationship. Heat is extracted from the stream of substantially pure oxygen, and the extracted heat is used to heat the feed air that also passes through the first heat transfer unit 38. The substantially pure and compressed oxygen then exits the first heat transfer unit 38 via output 42 for storage in oxygen storage tank 18. If the stream of substantially pure oxygen is insufficiently cooled after exiting the first heat transfer unit 38, a chiller 44 can be engaged to further cool the substantially pure compressed oxygen stream prior to storage in the oxygen storage tank 18.

In an emergency, the substantially pure and compressed oxygen stored in oxygen storage tank 18 then can be fed to the power unit 14 via line 20 and valve 64 to provide an enriched oxidant for a fast and reliable start up of power unit 14, or the oxygen can be fed into the aircraft cockpit or cabin 60 by line 46 and valve 66 for use by the aircraft crew and passengers.

Similarly, the stream of nitrogen-enriched air exiting air separator 28 is directed to a second heat transfer unit 44 by line 46. The heated stream of nitrogen-enriched gas is cooled by the second heat transfer unit 44, and the extracted heat is used to further heat the stream of feed air that passes through the second heat transfer unit 44. The cooled stream of nitrogen-enriched air exiting the second heat transfer unit 44 via output 48 can be directed to fuel tank 12 by line 50, control valve 52 and line 54 to provide an inert blanket over the fuel in fuel tank 12.

The nitrogen-enriched air has an oxygen content well below the usual 21%, such as about from about 5% to about 9% oxygen, and therefore will not support combustion. The nitrogen-enriched air is introduced to the fuel tank 12 such that a combustion supporting mixture of oxidant and fuel vapor cannot exist within the fuel tank 12, and any fire hazard associated therewith is eliminated. Alternatively, the stream of nitrogen-enriched air can be stored in nitrogen storage tank 56 or can be vented overboard by line 58.

Therefore, it was observed that the above-described system and method provide a substantially pure stream of oxygen in a compressed form without the need for a compressor. The substantially pure oxygen, including about 99% or greater oxygen, is available to quickly and reliably start and maintain combustion in an aircraft emergency or auxiliary power unit in the case of an in-flight emergency. The present invention eliminates the landbased problems involving the storage of compressed air, oxygen or oxygen-enriched air; the onboard problems of bulky and heavy compressed air or compressed oxygen tanks and compressors; and the problem of recharging spent compressed gas tanks on the ground. The present invention provides for the on-board generation of high purity and compressed oxygen, in flight, from bleed air, ram air or unpressurized ambient air without the need of a compressor. Accordingly, substantially pure oxygen is generated continuously, and in a compressed form, in flight, for storage or use in an emergency situation.

I claim:

1. A system for providing combustion oxygen to an aircraft emergency power unit during in-flight starting procedures, comprising:
    an oxygen separator operative at a temperature of about 400° C. to about 1000° C. while the aircraft is in flight, said oxygen separator having an input that receives feed air and an output at which compressed oxygen is developed;
    a storage tank;
    first means for interconnecting the output of the oxygen separator and the storage tank whereby compressed oxygen is cooled prior to storage thereof in the storage tank; and
    second means for interconnecting the storage tank and the emergency power unit and operative in response to an engine start command to transfer compressed oxygen to a fuel combustion chamber of the emergency power unit.

2. The system of claim 1, wherein the first interconnecting means comprises a heat exchanger that places the compressed oxygen in heat-transfer relationship with the feed air.

3. The system of claim 2, wherein the separator includes a further output at which nitrogen-enriched air is produced.

4. The system of claim 3, including a further heat exchanger coupled to the further output that places the nitrogen-enriched air in heat-transfer relationship with the feed air.

5. In an aircraft starting system having a power unit that burns fuel and produces motive power for starting an aircraft engine in flight, the improvement comprising:
    means for separating oxygen, said oxygen separating means operative during in-flight procedures to derive compressed, substantially pure oxygen from feed air provided thereto, and said oxygen separating means having an input to receive the feed air and an output at which compressed oxygen is derived without the use of a compressor;
    means for storing the substantially pure oxygen in compressed form;
    a heat exchanger having first and second portions in thermal contact with one another wherein the first portion receives the feed air and delivers it to the input of the oxygen separating means and wherein the second portion is coupled between the output of the oxygen separating means and the storing means; and
    means coupled between the storing means and the power unit for delivering the compressed oxygen to the power unit whereby such oxygen acts as an oxidizer for the fuel.

6. The improvement of claim 5, wherein the oxygen separating means produces nitrogen-enriched air at a second output and further including second means for storing the nitrogen-enriched air.

7. The improvement of claim 6, further including a heat exchanger having first and second portions in thermal contact with one another wherein the first portion receives the feed air and delivers it to the input of the oxygen separating means and wherein the second portion is coupled between the second output of the oxygen separating means and the second storing means.

8. An improvement in an aircraft starting system having a power unit that burns fuel and produces motive power for starting an aircraft engine in flight, the improvement comprising:

means for separating oxygen, said oxygen separating means operative during in-flight procedures to derive compressed, substantially pure oxygen from feed air provided thereto, and said oxygen separating means having an input to receive the feed air, a first output at which the compressed, substantially pure oxygen is derived without the use of a compressor and a second output at which nitrogen-enriched air is produced;

means for storing the substantially pure oxygen in compressed form;

means coupled between the oxygen storing means and the power unit for delivering the compressed oxygen to the power unit whereby such oxygen acts an oxidizer for the fuel;

a heat exchanger having first and second portions in thermal contact with one another wherein the first portion receives the feed air and delivers it to the input of the oxygen separating means and wherein the second portion is coupled between the second output of the oxygen separating means and the second storing means.

9. The improvement of claim 8, wherein the means for separating oxygen comprises a ceramic type oxygen separator.

10. The improvement of claim 1, wherein the second storing means comprises an aircraft fuel tank.

11. A system for providing combustion oxygen to an aircraft emergency power unit during in-flight starting procedures, comprising:

a ceramic type oxygen separator operative while the aircraft is in flight having an input that receives feed air, a first output at which compressed oxygen is developed and a second output at which nitrogen-enriched air is produced;

a storage tank;

a heat exchanger coupled to the first output that places the compressed oxygen in heat-transfer relationship with the feed air to cool the compressed oxygen prior to storage thereof in the storage tank;

a second heat exchanger coupled to the second output that places the nitrogen-enriched air in heat-transfer relationship with the feed air; and means for interconnecting the storage tank and the emergency power unit, said interconnecting means operative in response to an engine start command to transfer compressed oxygen from the storage tank to a fuel combustion chamber of the emergency power unit.

* * * * *